Oct. 11, 1960  W. T. GRAY  2,955,636
DUAL PRESSURE TIRE
Filed Nov. 25, 1958
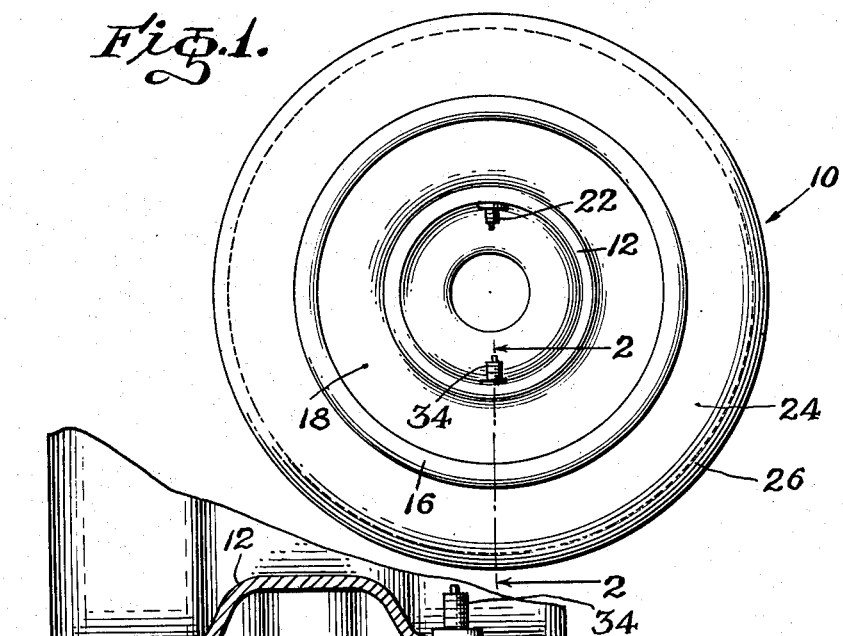
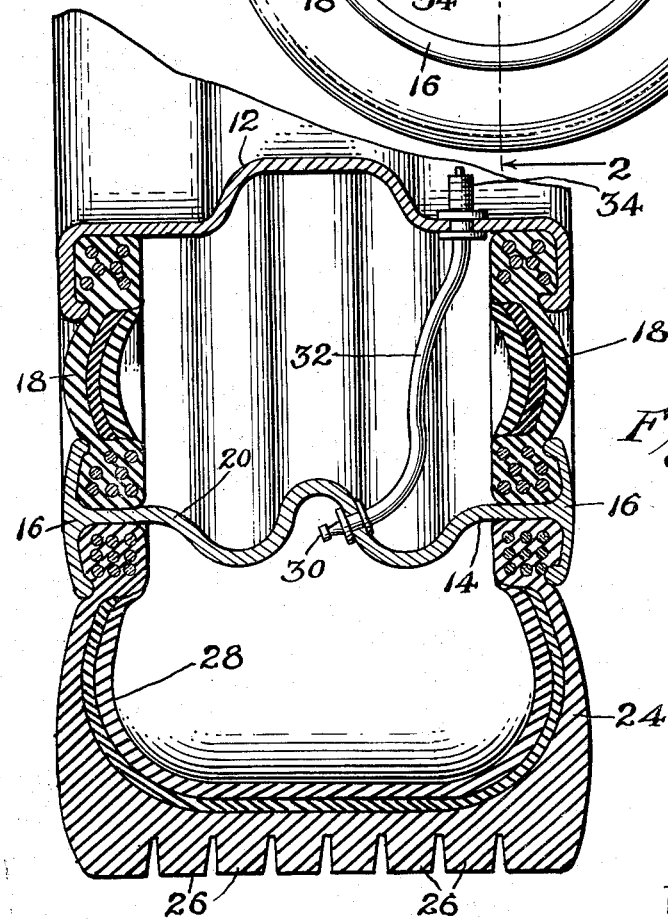
INVENTOR
William T. Gray

United States Patent Office 2,955,636
Patented Oct. 11, 1960

2,955,636

DUAL PRESSURE TIRE

William T. Gray, Lomita, Calif.
(Sandstone, Minn.)

Filed Nov. 25, 1958, Ser. No. 776,365

1 Claim. (Cl. 152—340)

This invention relates to automotive vehicles and, more particularly, to a wheel assembly therefor.

It is an object of the present invention to provide a longer wearing and substantially safer wheel and tire assembly for all types of automotive vehicles that will provide a more comfortable ride while at the same time prolonging the useful life thereof and promoting safety on the highways.

A further object of the present invention is to provide a dual pressure wheel assembly of the above type that actually includes two separate pneumatic pressure chambers so that the wheel will be sustained in the event that one of such chambers is accidentally impaired, such as by a blow out or leak.

Other objects of the invention are to provide a dual pressure tire bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a dual pressure wheel assembly made in accordance with the present invention; and Figure 2 is an enlarged fragmentary transverse cross sectional view taken along line 2—2 of Figure 1.

Referring now more in detail to the drawing, a dual pressure wheel assembly 10 made in accordance with the present invention is shown to include an inner main mounting rim 12 and a slightly larger outer auxiliary spacer rim 14. As is more clearly shown in Figure 2 of the drawing, the auxiliary spacer rim 14 includes transversely-extending flanges 16 at each end that define inwardly and outwardly opening channels for purposes hereinafter described.

A pair of substantially flexible annular panels 18 are secured in spaced apart parallel relationship between the flanges of the inner rim 12 and the inwardly facing portions of the end flanges 16 of the spacer rim 14 so as to define an inner pneumatic pressure compartment 20 that may be filled with pressurized air by means of a pneumatic pressure check valve 22 carried by the inner rim 12. A tire casing 24 is mounted upon the other portions of the flanges 16 of the spacer rim 14 to define an outer pneumatic pressure compartment 28 therewith that may be conveniently filled with pressurized air by means of a nozzle 30 carried by the spacer rim 14 and connected to another pneumatic pressure check valve 34 by means of a flexible connecting line 32.

It will now be recognized that the pressure within the inner and outer compartments 20, 28 may be individually controlled by means of individual check valves 22, 34, respectively. As a result, it is possible to use a higher pressure on the outer casing 24 in order to prolong the effective life of the treads 26, while the inner compartment 20 may be maintained at a slightly lower pressure to provide a softer ride and so as to transmit fewer road shocks. The flexible side walls or panels 18 are particularly designed for constant flexing so as to provide a safe and effective cushion for all types of automotive vehicles. In the event that one of the compartments is punctured, such as by a blow out or slow leak, the air within the other one of the compartments will maintain the wheel in an operative condition until repairs can be made.

While various changes may be made in the detail construction, it shall be understood that such changes shall be within the spirit and scope of the present invention as defined by the appended claim.

What I claim as new and desire to protect by Letters Patent of the United States is:

A dual pressure wheel assembly comprising an inner main mounting rim having channel-like flanges opposing one another and lying respectively at the opposite sides thereof, an outer auxiliary spacer rim of substantially larger diameter than the diameter of said main mounting rim, said spacer rim having a web and transversely-extending end flanges integral with the respective sides of the web and providing inwardly and outwardly opening channels thereat, flexible annular spaced apart sidewall panels extending between the channel flanges of said inner and outer rims and providing an inner pressurized air compartment therewith, a tubeless pneumatic tire mounted upon said demountable auxiliary spacer rim between the outer channels thereof and providing an outer pressurized air compartment therewith, a first check valve carried by said inner main mounting rim communicating with said inner compartment, a second check valve carried by said inner rim and air conducting means connected to said second check valve and communicating with said outer compartment.

References Cited in the file of this patent

UNITED STATES PATENTS

| 2,525,752 | Khalil | Oct. 10, 1950 |

FOREIGN PATENTS

| 18,605 | Great Britain | of 1899 |
| 1,155,291 | France | Nov. 25, 1957 |